(12) United States Patent
Amano

(10) Patent No.: US 9,517,560 B2
(45) Date of Patent: Dec. 13, 2016

(54) ROBOT SYSTEM AND CALIBRATION METHOD OF THE ROBOT SYSTEM

(71) Applicant: CANON KABUSHIKI KAISHA, Tokyo (JP)

(72) Inventor: Shingo Amano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 14/332,143

(22) Filed: Jul. 15, 2014

(65) Prior Publication Data

US 2015/0025683 A1 Jan. 22, 2015

(30) Foreign Application Priority Data

Jul. 22, 2013 (JP) ................................. 2013-151718

(51) Int. Cl.
*B25J 9/16* (2006.01)
*G05B 19/401* (2006.01)
*B25J 9/02* (2006.01)
*B25J 9/10* (2006.01)

(52) U.S. Cl.
CPC .... *B25J 9/1692* (2013.01); *G05B 2219/39008* (2013.01); *G05B 2219/39022* (2013.01); *Y10S 901/47* (2013.01)

(58) Field of Classification Search
CPC .................. B25J 9/1962; G05B 5/143; G05B 2219/37017; G05B 2219/37053; G05B 2219/37067; G05B 2219/39057; G05B 2219/37422; G05B 2219/39045; G05B 2219/37571;G05B 2219/40613; G05B 2219/40622; G01B 11/002–11/007; G06T 7/0018
See application file for complete search history.

(56) References Cited

U.S. PATENT DOCUMENTS

| 5,471,312 A | 11/1995 | Watanabe et al. | |
|---|---|---|---|
| 6,163,946 A * | 12/2000 | Pryor | A01B 69/008 29/407.04 |
| 6,724,930 B1 * | 4/2004 | Kosaka | G01B 11/002 382/154 |
| 2005/0159842 A1 * | 7/2005 | Ban | B25J 19/023 700/245 |

(Continued)

FOREIGN PATENT DOCUMENTS

| JP | 2700965 B2 | 1/1998 |
|---|---|---|
| JP | 3644991 B2 | 5/2005 |

*Primary Examiner* — Dale Moyer
(74) *Attorney, Agent, or Firm* — Fitzpatrick, Cella, Harper & Scinto

(57) ABSTRACT

A control apparatus calculates a calibration value based on a position in the robot coordinate system 41 and a position in the vision coordinate system 42, for at least three teaching points set within a calibration area. Markers 21 of two of the three teaching points have the same inclination in relation to an optical axis of a camera 3 as a visual sensor, and the two points are placed on different positions of the same plane normal to the optical axis. The remaining one of the three teaching points other than the two points is set such that the inclination of the marker 21 in relation to the optical axis is different from that of the two points. As a result, influence of a large quantization error in the optical axis direction as a measurement error of the camera 3 can be reduced.

13 Claims, 5 Drawing Sheets

(56) References Cited

U.S. PATENT DOCUMENTS

| | | | |
|---|---|---|---|
| 2008/0216552 A1* | 9/2008 | Ibach | B25J 9/1692 73/1.01 |
| 2008/0239327 A1* | 10/2008 | Bryll | G01B 21/042 356/623 |
| 2009/0118864 A1* | 5/2009 | Eldridge | B25J 9/1692 700/259 |
| 2009/0190826 A1* | 7/2009 | Tate | G06T 7/0042 382/153 |
| 2010/0246895 A1* | 9/2010 | Koike | G03B 15/00 382/106 |
| 2011/0235054 A1* | 9/2011 | Koike | B25J 9/1697 356/620 |
| 2012/0143370 A1* | 6/2012 | Shieh | B25J 9/1692 700/254 |
| 2013/0010081 A1* | 1/2013 | Tenney | G06T 7/002 348/47 |
| 2013/0265393 A1* | 10/2013 | Takemoto | G06T 7/0018 348/46 |
| 2014/0188274 A1* | 7/2014 | Namiki | B25J 9/1697 700/254 |
| 2015/0088311 A1* | 3/2015 | Suzuki | B25J 9/1697 700/254 |

* cited by examiner

ROBOT SYSTEM AND CALIBRATION METHOD OF THE ROBOT SYSTEM

BACKGROUND OF THE INVENTION

Field of the Invention

The present invention relates to a robot system in which a visual sensor, such as a camera, measures a position of a work to correct an operating position of a robot body and to a calibration method of the robot system for calibrating the robot system.

Description of the Related Art

In recent years, automatic assembly by a robot is often used in a production line of a factory to automate operation and save manpower. In the automatic assembly, a system with a combination of a robot body, such as a multi-jointed arm, and a visual sensor, such as a camera, is used. Particularly, there is an increased need recently for a visual sensor to three-dimensionally measure a work as an object of operation.

When a visual sensor measures a position of a work to correct operation of a robot body based on the position, position and orientation data of the work measured by the visual sensor needs to be converted to data on a coordinate system fixed to the robot body. Therefore, a relationship between a coordinate system used for measurement data of the visual sensor (hereinafter, "vision coordinate system") and a coordinate system fixed to the robot body (hereinafter, "robot coordinate system") needs to be obtained in advance. Calibration between the coordinate systems is generally called "hand-eye calibration". Calibration accuracy of a relative position and orientation between the vision coordinate system and the robot coordinate system is directly related to operating position correction accuracy of the robot body using the visual sensor. Therefore, it is desirable to increase the accuracy of the hand-eye calibration.

Conventionally, an example of a method of hand-eye calibration without using accurate design data or a special jig includes the following technique related to a robot arm including an on-hand camera on the wrist. More specifically, sensor output indicating positions related to the same object as a reference is obtained from at least three positions not arranged in a straight line. A method is proposed, wherein hand-eye calibration is performed by executing software processing based on data expressing the output on the robot coordinate system and data expressing the sensor output (see Japanese Patent No. 3644991).

Also proposed is an automatic hand-eye calibration system using a jig that indicates a positional relationship between a marker that can be observed by a sensor and a point for the robot to touch up (see Japanese Patent No. 2700965).

The relative positional relationship between the robot coordinate system and the vision coordinate system is calculated by these methods.

However, in the method described in Japanese Patent No. 3644991, the measurement accuracy of the camera may not be sufficiently utilized depending on teaching points used in the hand-eye calibration. In general, a measurement error of a camera is large in the optical axis direction due to influence of a quantization error. More specifically, when a camera including light receiving units with finite pixels measures the position of an object, detected positions of the object are discrete, and there is a quantization error.

A triangulation method is used to calculate the position of the object in the optical axis direction of the camera based on the distance between two points on the object in the horizontal axis direction of the camera. A position measurement error in the optical axis direction of the camera is composed of a position measurement error of two points in the horizontal axis direction of the camera, and the position measurement error in the optical axis direction of the camera is generally greater than the position measurement error in the horizontal axis direction of the camera. Therefore, when the relative positions and orientations of the object as a reference and the camera, that is, the teaching points used in the calibration, are searched by manual trial and error in the actual operation site, the teaching points suitable for the calibration are not selected in some cases, and there is a problem that the calibration accuracy is not sufficient.

In the method described in Japanese Patent No. 2700965, although a plurality of points are not necessary for the relative position and orientation of the marker as a reference and the camera, a special jig in which accurate design data is apparent is required. The cost of the special jig in which accurate design data is apparent is higher than a normal jig, and many man-hours are necessary.

In view of the circumstances, an object of the present invention is to provide a robot system and a calibration method of the robot system, wherein a special jig in which accurate design data is apparent is not necessary, and accuracy of calibration between a robot coordinate system and a vision coordinate system can be further improved.

SUMMARY OF THE INVENTION

According to an aspect of the present invention, a robot system comprises: a robot body configured to operate a work; a visual sensor; and a control apparatus configured to control a position and an orientation of the robot body, and to calculate the position and the orientation of the work using a measured value by the visual sensor, wherein, when a observing of a marker by the visual sensor is performed for a calibration between a robot coordinate system fixed to the robot body and a vision coordinate system fixed to the visual sensor, a calibration value is calculated based on a position of the robot body in the robot coordinate system, and a position of the marker in the vision coordinate system, for at least the three teaching points set within a calibration area, two of the three teaching points are placed on different positions in a same plane normal to an optical axis of the visual sensor, the markers of the two of the three teaching points have the same inclination in relation to the optical axis of the visual sensor, and the marker of one except for the two of the three teaching points has an inclination different from that of the two of the three teaching points.

According to a further aspect of the present invention, provided is a calibration method of a robot system, wherein the robot system comprises: a robot body configured to operate a work; a visual sensor; and a control apparatus configured to control a position and an orientation of the robot body, and to calculate the position and the orientation of the work using a measured value by the visual sensor, wherein the calibration method is performed for a calibration between a robot coordinate system fixed to the robot body and a vision coordinate system fixed to the visual sensor, and the calibration method comprises operating, by the control apparatus, the robot body to obtain the three teaching points within a calibration area; and observing a marker by the visual sensor, to calculate a calibration value based on a position of the robot body in the robot coordinate system, and a position of the marker in the vision coordinate system, for at least the three teaching points, wherein two of the three teaching points are placed on different positions in a same plane normal to an optical axis of the visual sensor, the markers of the two of the three teaching points have the same inclination in relation to the optical axis of the visual sensor, and the marker of one except for the two of the three teaching points has an inclination different from that of the two of the three teaching points.

According to the present invention, markers of two of at least three teaching points have the same inclination in relation to the optical axis, and the two teaching points are placed on different positions on the same plane normal to the optical axis. Therefore, the influence of a large quantization error in the optical axis direction can be reduced. The accuracy of the calibration between the robot coordinate system and the vision coordinate system can be further improved. A special jig in which accurate design data is apparent is not necessary in the calibration, and the accuracy of calibration can be further improved at a low cost.

Further features of the present invention will become apparent from the following description of exemplary embodiments with reference to the attached drawings.

DESCRIPTION OF THE EMBODIMENTS

Figure 1:
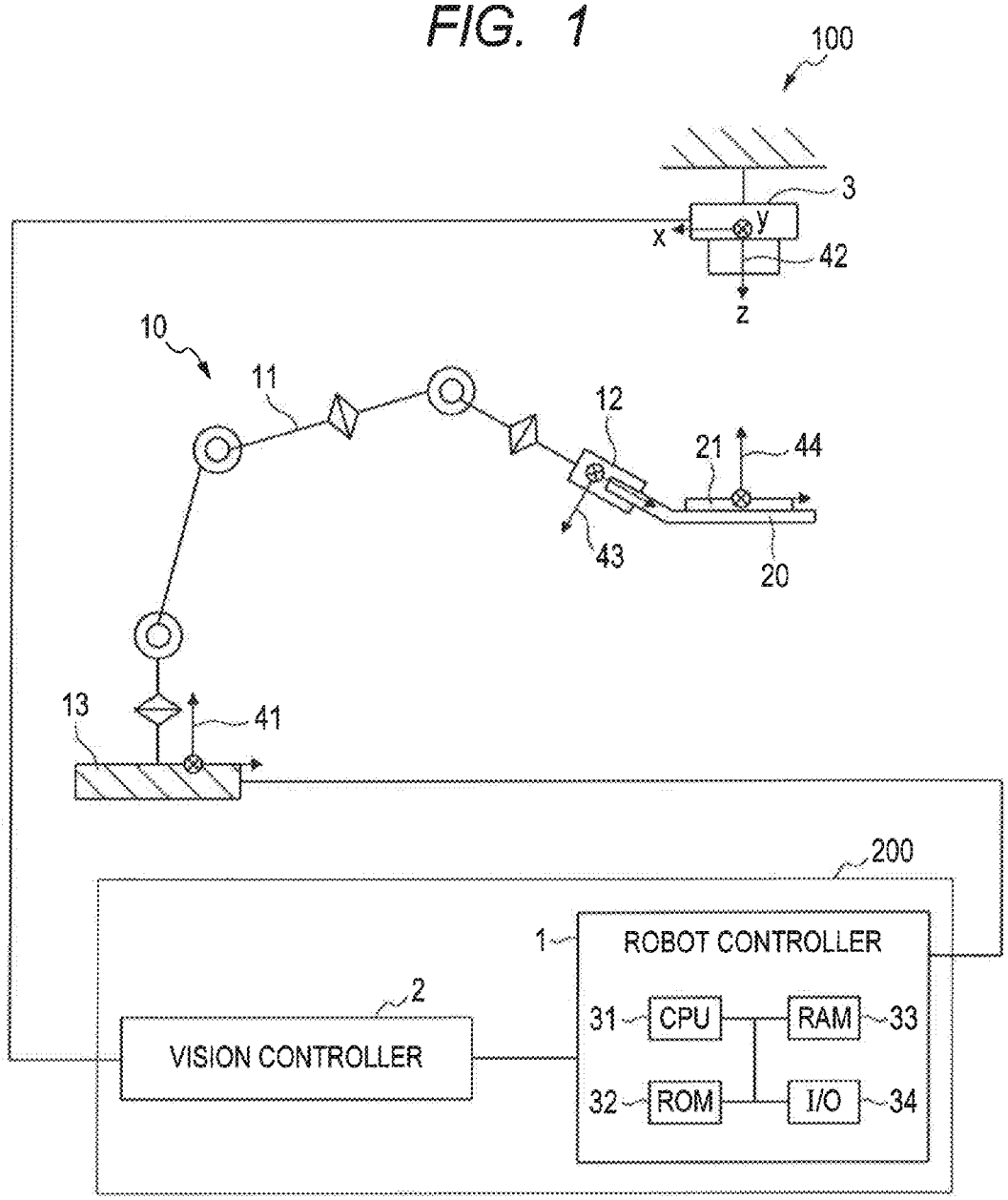
FIG. 1 is a schematic configuration diagram of a robot system according to a first embodiment of the present invention.

Preferred embodiments of the present invention will now be described in detail in accordance with the accompanying drawings.

First Embodiment

A first embodiment of the present invention will be described with reference to FIGS. 1 to 5. First, a schematic configuration of a robot system of the present embodiment will be described with reference to FIG. 1.

[Robot System]

A robot system 100 of the present embodiment includes a control apparatus 200, a robot body 10, and a camera 3 as a visual sensor. The control apparatus 200 controls a position and an orientation of the robot body 10 and uses a measured value of the camera 3 to calculate the position and the orientation of a work. The control apparatus 200 includes a robot controller 1 and a vision controller 2. The robot body 10 and the vision controller 2 are connected to the robot controller 1. The camera 3 is connected to the vision controller 2. A hand 12 as an end effector of the robot body 10 holds a calibration jig 20. Hereinafter, the components will be described.

The robot body 10 includes a multi-jointed arm 11 (hereinafter, called "arm") and the hand (end effector) 12 and operates a work. The arm 11 is a six-axis vertical multi-jointed arm including seven links and six joints for connecting the links, allowing the links to swing or turn. Although the arm 11 is a six-axis vertical multi-jointed arm in the present embodiment, the arm 11 is not limited to this. The number of axes may be appropriately changed according to the application or the object. The arm 11 is fixed to a base 13, and a robot coordinate system 41 indicating the position and orientation of the arm 11 based on the base 13 is set on the base 13. In other words, the robot coordinate system 41 is a coordinate system fixed to the robot body 10.

A motor that drives each joint or a linear motion actuator as necessary is arranged as an output device on each joint of the arm 11. An encoder that detects the rotation angle of the motor, a current sensor that detects the current supplied to each motor, and a torque sensor that detects the torque of each joint are arranged as input devices on each joint.

The arm 11 is configured to drive each joint based on a command value output from the robot controller 1 of the control apparatus 200 to adjust the position and orientation of the hand 12. The robot controller 1 is configured to calculate a desirable angle of each joint of the arm 11 in relation to a target value of a relative position and orientation of a tool coordinate system 43 based on the robot coordinate system 41 to output a command value to each joint. The robot controller 1 can acquire current angle information of each joint from the encoder to calculate the relative position and orientation of the tool coordinate system 43.

The hand 12 is supported at the tip of the arm 11, and the position and orientation of the hand 12 is adjusted by the operation of the arm 11. The hand 12 includes, for example, three fingers that can hold the work or the calibration jig 20. The tool coordinate system 43 is set on the hand 12 based on the hand 12. In the present embodiment, the hand 12 that can grasp a work is applied as an end effector. However, the arrangement is not limited to this, and a general end effector that can operate the work can be included, such as a mechanism for holding the work by means other than grasping and a tool for processing the work.

The camera 3 is a visual sensor that measures the positions of the work and a marker 21 from a fixed position. The camera 3 images the marker 21 as a reference for calibration described later and an object, such as a work that is an actual operation target, and transmits an image signal to the vision controller 2. Although a monocular camera is used as the camera 3 that is a visual sensor in the present embodiment, the visual sensor may be one of a compound camera, a laser range finder and a combination of the compound camera and the laser range finder. The camera 3 is provided with a vision coordinate system 42 measured by the camera 3 based on the optical axis direction and the vertical and horizontal directions of the imaging visual field.

The robot controller 1 includes a CPU 31 as a computer as well as a ROM 32, a RAM 33 and a general-purpose signal interface 34 connected to the CPU 31 through a bus. The ROM 32 stores a program for controlling the robot system 100. The RAM 33 stores a program for controlling operation of the robot body 10, transmission of a command to the vision controller 2 and reception of an image processing result from the vision controller 2 and stores related setting values. The RAM 33 is also used as a memory for temporary storage during computation by the CPU 31 and as a register area that is set as necessary. The general-purpose signal interface 34 functions as an input/output apparatus for a servo circuit that controls the vision controller 2 and each axis of the robot body 10, an off-line programming apparatus, and a control unit of a manufacturing line.

The vision controller 2 converts an image signal imported through the camera 3 to a contrast signal based on grayscale and stores the contrast signal in a frame memory. The vision controller 2 also processes an image stored in the frame memory, identifies an object such as a work and the marker 21, and measures the position and orientation. The position and the orientation measured here are data equivalent to a position and an orientation of the marker coordinate system 44 based on the vision coordinate system 42. The vision controller 2 further transmits an identification result of the processed object and the position and the orientation to the robot controller 1. A light (not illustrated) may be connected to the vision controller 2. In this case, the vision controller 2 also controls the light.

The calibration jig 20 can fix the marker 21 in the calibration of the robot system 100, and the calibration jig 20 is fixed to one of the hand 12 and the arm 11. For example, the hand 12 holds the calibration jig to fix the calibration jig 20 to the hand 12. The location of the calibration jig 20 where the marker 21 is fixed may not be known.

Figure 2:
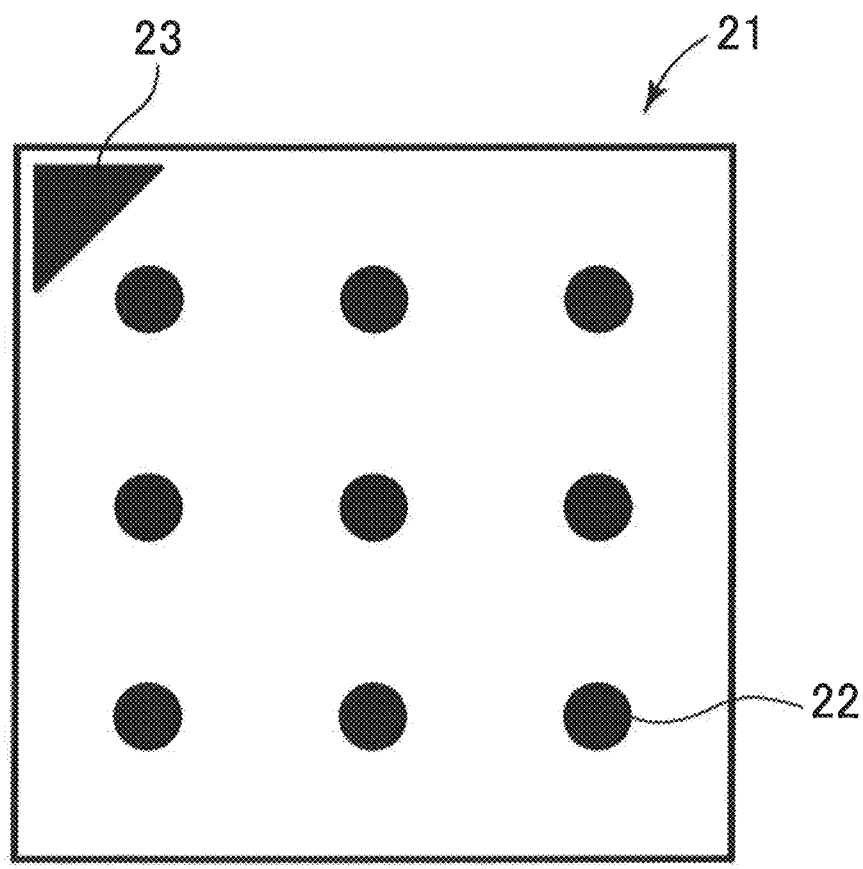
FIG. 2 is a plan view of a marker used in the first embodiment.

The camera 3 observes the marker 21 for the calibration. As illustrated in FIG. 2, a plurality of dots 22, such as holes and prints, are provided as a pattern, and the positions between the dots 22 are stored in advance as setting values in the vision controller 2. As a result, the vision controller 2 can measure the position and orientation of the marker 21. The attitude of the marker 21 can be uniquely obtained by a triangle 23 provided to the marker. The marker 21 may be three-dimensional instead of planar, as long as the camera 3 can observe the marker 21.

The robot system 100 with the configuration controls the robot body 10 based on an operation program stored in a memory of the robot controller 1. The operation of the robot body 10 can position the calibration jig 20 in an arbitrary position and orientation in an operation range of the robot body 10.

A calibration method between the robot coordinate system 41 and the vision coordinate system 42 of the robot system 100 according to the present embodiment will be described. As a prerequisite, the location of the calibration jig 20 where the marker 21 is fixed is not known. The calibration of each coordinate system is finished. In this case, the camera 3 and the marker 21 generally take different relative positions and the orientations of at least three points. More specifically, for example, the user instructs relative positions and the orientations of at least three points through the general-purpose signal interface 34 such as a teaching pendant. In the calibration between the robot coordinate system 41 and the vision coordinate system 42, the control apparatus 200 calculates a calibration value based on a position in the robot coordinate system 41 and a position in the vision coordinate system 42, for at least three teaching points set within a calibration area.

In this case, the relative position and orientation of the robot coordinate system 41 and the tool coordinate system 43 and the relative position and orientation of the vision coordinate system 42 and the marker coordinate system 44 need to be obtained at each point. As a result, the relative position and orientation of the robot coordinate system 41 and the vision coordinate system 42 to be calibrated can be obtained.

Figure 3A:
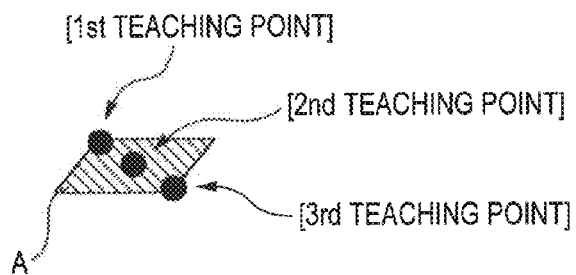
FIG. 3A is a schematic diagram illustrating three teaching points used in the present embodiment.
Figure 3B:
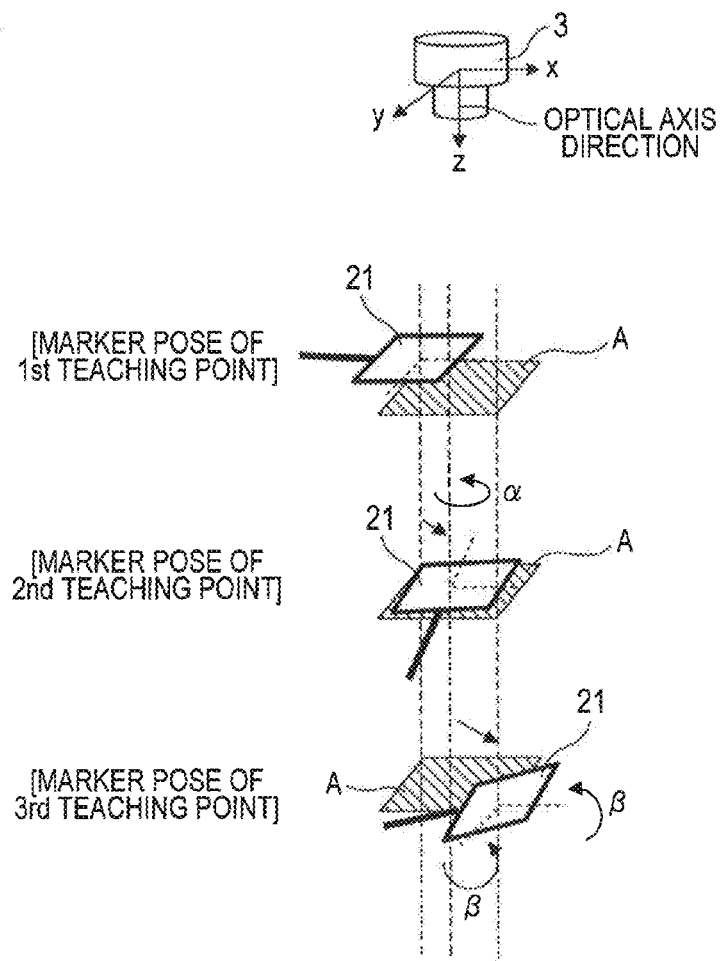
FIG. 3B is a schematic diagram illustrating relative and orientation of a camera and the markers at the teaching points.

A setting method of at least three teaching points used in the calibration will be described with reference to FIGS. 3A and 3B. FIG. 3A illustrates teaching points and a calibration area, and FIG. 3B illustrates relative position and orientations of the camera and the markers. The reference markers 21 of two of the three teaching points have the same inclination in relation to the optical axis (z axis) of the camera 3, and the two of the three teaching points are placed on different positions of a same plane A normal to the optical axis. The plane A illustrated in FIGS. 3A and 3B is a plane normal to the optical axis of the camera 3 set in the range of the angle of view of the camera 3, and the plane indicates the calibration area between the robot coordinate system and the vision coordinate system. Although the optical axis of the camera 3 here is the optical axis (z axis) set in the robot coordinate system 41, the optical axis coincides with the optical axis of the actual camera 3, because the calibration of the robot coordinate system 41 is finished as described above. The optical axis may coincide with the optical axis of the camera 3 of a design value. The remaining one of the three teaching points other than the two points is set such that the inclination of the marker 21 in relation to the optical axis is different from that of the two points. At least three teaching points can be set in this way, and more than three teaching points may also be arranged. The teaching points can be set in any order. A possible position and orientation of teaching point is that the marker 21 falls within the area of the angle of view and falls within the area of the rotation angle necessary in the calibration. The positions and the orientations may be the same in second and third embodiments described later.

The control apparatus 200 operates the robot body 10 as follows to obtain the teaching points that are set as described above. More specifically, the marker 21 for calibration and the camera 3 are relatively rotated at a first predetermined angle α around an axis parallel to the optical axis to obtain two teaching points at different positions on the same plane A. Since the camera 3 is fixed in the present embodiment, the robot body 10 rotates the marker 21 around the axis parallel to the z axis to obtain two teaching points. In this case, the marker 21 can be rotated, with the plane provided with the dots 22 of the marker 21 being parallel to the plane A. However, even if the planes provided with the dots 22 of the markers 21 are inclined with respect to the plane A, the centers of the markers 21 can be positioned on the plane A at two teaching points, and the inclination of the planes of the markers 21 in relation to the optical axis (z axis) of the camera 3 can be the same. The first predetermined angle α meets a relation 0°<α<180°. The "axis parallel to the optical axis" can be parallel, or the inclination of the axis can be in a range of ±2 deg.

The marker 21 and the camera 3 are relatively rotated at a second predetermined angle β in relation to the axis parallel to the optical axis to obtain one teaching point in which the inclination of the marker 21 in relation to the optical axis is different from that of the two points. In the present embodiment, the robot body 10 tilts the marker 21 with respect to the axis parallel to the z axis. In other words, the marker 21 is tilted with respect to the plane A more than when the two teaching points are obtained. As a result, the plane provided with the dots 22 of the marker 21 is out of the same plane A. The second predetermined angle β meets a relation 5°≤β≤10°.

If the second predetermined angle β is 5° or smaller, it is difficult to obtain a difference from the two teaching points. In other words, it is desirable that the third teaching point is surely deviated from the first and second teaching points in the data for calibration. Therefore, the second predetermined angle β is set to 5° or greater. On the other hand, if the second predetermined angle β is greater than 10°, the measurement of the plurality of dots 22 of the marker 21 measured by the remaining one point may be difficult compared to the plurality of dots 22 of the markers 21 measured by the two points. In other words, the second predetermined angle β can be 10° or smaller to allow the camera 3 to accurately recognize the plurality of dots 22 of the markers 21 of the three teaching points.

A specific setting method of the teaching points will be described. The positions and the orientation to be calibrated are selected for the first teaching point. The second teaching point is at a relative angle (first predetermined angle) α designated by the user around the optical axis (z axis) with respect to the first teaching point, and the second teaching point takes a position and an orientation translated in the xy directions perpendicular to the optical axis. More specifically, the optical axis is selected as an axis parallel to the optical axis that is a rotation axis of the rotational movement from the first teaching point to the second teaching point. The relative angle α here is 90°. The third teaching point is at a relative angle (second predetermined angle) β designated by the user around two axes other than the optical axis, that is, around the xy axes, and the third teaching point takes a position and an orientation different from the first and second teaching points. As illustrated in FIG. 3A, the three teaching points can be arranged so that the centers of the markers 21 have different positions and the orientations on the same plane A normal to the optical axis and can be arranged to maximize the area for calibration.

In the calibration method of the robot system 100 of the present embodiment, the robot controller 1 of the control apparatus 200 operates the robot body 10 such that the centers of the markers 21 coincide with at least the three teaching points (operation step). The control apparatus 200 calculates the calibration values based on the positions in the robot coordinate system 41 and the positions in the vision coordinate system 42, for at least three teaching points (calibration step).

More specifically, in the calibration step, the relative position and orientation of the robot coordinate system 41 and the tool coordinate system 43 and the relative position and orientation of the vision coordinate system 42 and the marker coordinate system 44 are obtained at each teaching point. Since the robot coordinate system 41 and the tool coordinate system 43 are synonymous with the position and orientation of the teaching point, the relative position and orientation can be obtained from the robot controller 1. Since the relative position and orientation of the vision coordinate system 42 and the marker coordinate system 44 can be obtained by observation of the marker 21 by the camera 3, the relative position and orientation can be acquired from the vision controller 2.

The relative position and orientation can be expressed by translational components and Euler angles X, Y, Z, Rx, Ry and Rz. These are defined as in the following formula in a form of a homogeneous transformation matrix H.

[Expression 1]

$$H = \begin{bmatrix} & & & X \\ Rotz(Rz) & Roty(Ry) & Rotx(Rx) & Y \\ & & & Z \\ & O_{1\times3} & & 1 \end{bmatrix} \quad (1)$$

Rotx, Roty and Rotz denote 3×3 rotation matrices indicating rotation around the x, y and z axes, respectively.

The relative position and orientation of the robot coordinate system 41 and the vision coordinate system will be referred to as a homogeneous transformation matrix Hrv, and the relative position and orientation of the tool coordinate system 43 and the marker coordinate system 44 will be referred to as a homogeneous transformation matrix Htp. The relative position and orientations of the robot coordinate system 41 and the tool coordinate system 43 at three teaching points will be referred to as homogeneous transformation matrices Hrt1, Hrt2 and Hrt3. The relative position and orientations of the vision coordinate system 42 and the marker coordinate system 44 will be referred to as homogeneous transformation matrices Hvp1, Hvp2 and Hvp3, and the following simultaneous equations can be obtained.

[Expression 2]

$$\begin{cases} HrvHvp1 = Hrt1Htp \\ HrvHvp2 = Hrt2Htp \\ HrvHvp3 = Hrt3Htp \end{cases} \quad (2)$$

Optimized calculation of Hrv and Htp can be performed to solve Expression (2) to obtain the relative position and orientation Hrv of the robot coordinate system 41 and the vision coordinate system 42 to be calibrated. Htp denotes the relative position and orientation of the tool coordinate system 43 and the marker coordinate system 44. Although not limited to this, a least squares method or the like can be used to solve the optimized calculation.

In the present embodiment, the markers 21 of two of the at least three teaching points have the same inclination in relation to the optical axis, and the two of the at least three teaching points are placed on different positions of the same plane A normal to the optical axis, as described above. Particularly, in the present embodiment, the planes provided with the dots 22 of the markers 21 are positioned on the same plane A at two teaching points. Therefore, the influence of a large quantization error in the optical axis direction as a measurement error of the camera 3 can be reduced, and the accuracy of the calibration between the robot coordinate system 41 and the vision coordinate system 42 can be further improved. In this calibration, a special jig in which accurate design data is apparent is not necessary, and the accuracy of the calibration can be further improved at a low cost.

Figure 4:
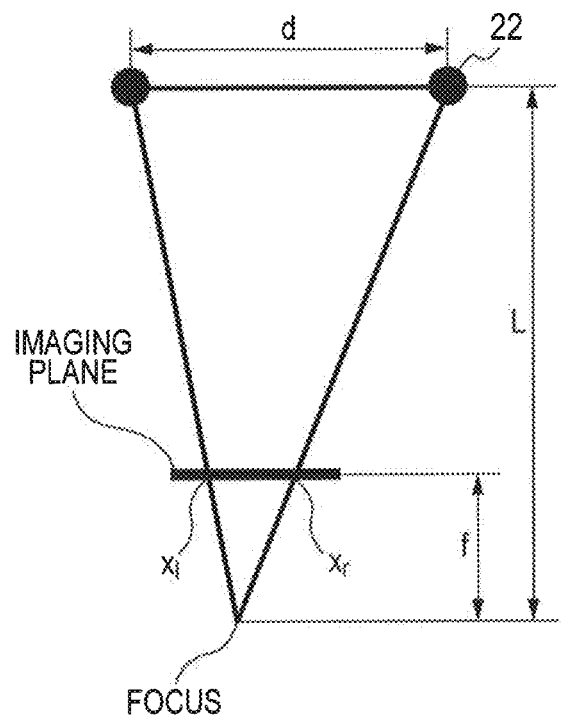
FIG. 4 is a schematic diagram when two dots are projected on an imaging plane of the camera.

FIG. 4 will be used to simply illustrate a principle of improving the calibration accuracy of the present embodiment. FIG. 4 is a schematic diagram illustrating marker observation and is a diagram simplified to describe the principle. First, the distance between the imaging plane of the camera 3 and the dots of the markers 21 will be accurately obtained. A distance L between the focus of the camera 3 and the dots is calculated by the following formula.

[Expression 3]

$$L = \frac{f \cdot d}{Xl - Xr} \quad (3)$$

In the formula, f denotes a distance between the focus and the imaging plane, d denotes a distance between two dots, and Xl and Xr denote pixel positions around the two dots projected on the imaging plane of the camera 3.

Since Xl and Xr are pixel positions of the sensor of the camera 3, there is a quantization error. Based on Expression (3), f is a distance between the focus and the imaging plane and is a constant. Therefore, the distance d between the two dots needs to be large to obtain large resolving power of the measured value L. Thus, the two dots 22 and the imaging plane of the camera 3 need to be parallel to each other to accurately measure the measured value L.

In the present embodiment, the markers 21 of two teaching points, that is, two of the position and orientations of the markers 21, have the same inclination in relation to the optical axis, and the two teaching points are placed on different positions on the same plane A normal to the optical axis. Therefore, the two teaching points are set to be parallel to the imaging plane of the camera 3. For example, even if the markers 21 are inclined with respect to the optical axis, or in other words, even if the markers 21 are inclined with respect to the imaging plane, the dots 22 of the markers 21 move parallel to the imaging plane. Therefore, the dots 22 at the two teaching points are set to be parallel to the imaging plane.

As a result, in the present embodiment, the distance between the two teaching points can be larger than when the two teaching points are not parallel to the imaging plane. The large quantization error in the optical axis direction that affects the measurement accuracy of the camera 3 can be reduced, and the accuracy of the calibration between the robot coordinate system 41 and the vision coordinate system 42 can be further improved. Particularly, if the planes provided with the dots 22 of the markers 21 are positioned on the same plane A at two teaching points as in the present embodiment, the measurement accuracy of the dots 22 by the camera 3 is improved, and the accuracy of the calibration can be further improved.

As described, the simultaneous equations are established from the relative position and orientation of the robot coordinate system 41 and the tool coordinate system 43 and the relative position and orientation of the vision coordinate system 42 and the marker coordinate system 44 obtained at each teaching point. The simultaneous equations are solved by optimized calculation to obtain the relative position and orientation of the vision coordinate system 42 and the robot coordinate system 41. As a solvable condition, in addition to the two points, one point other than the two points needs to be in a position and an orientation different from the two points. Therefore, in the present embodiment, one point other than the two points is set such that the inclination of the marker 21 in relation to the optical axis is different from that of the two points. As a result, the solvable condition for solving the simultaneous equations for the relative position and orientation of the vision coordinate system 42 and the robot coordinate system 41 can be satisfied.

In this way, a special jig in which accurate design data is apparent is not necessary in the calibration between the robot coordinate system 41 and the vision coordinate system 42 using the camera 3 and the marker 21, and the accuracy can be further improved.

Figure 5:
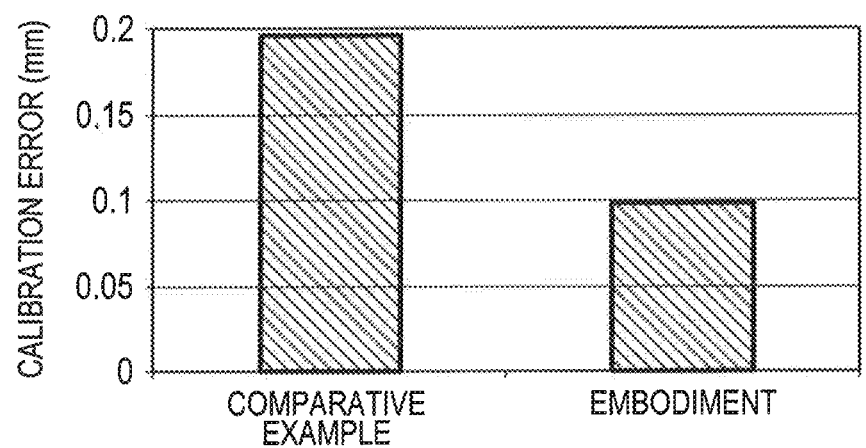
FIG. 5 is a diagram illustrating errors of calibration in the embodiment and a comparative example.

FIG. 5 is a diagram illustrating calibration errors between the robot coordinate system 41 and the vision coordinate system 42 in the embodiment and a comparative example. The embodiment denotes a case in which the calibration is performed as described above. On the other hand, the comparative example denotes a case in which the markers 21 and the imaging plane of the camera 3 are inclined at all teaching points, or in other words, a case in which the inclinations of the markers 21 in relation to the optical axis are different in all teaching points. As is apparent from FIG. 5, the calibration error in the embodiment can be reduced to about half of that of the comparative example.

The number of teaching points used in the calibration is not limited to three, and more than three points may be set as long as the three points satisfying the condition are included. In this case, the relationship of Expression (2) can be established at the points, and optimized calculation, such as a least squares method, can be performed to solve the formula. As a result, the relative position and orientation of the robot coordinate system and the vision coordinate system to be calibrated can be obtained.

Second Embodiment

Figure 6:
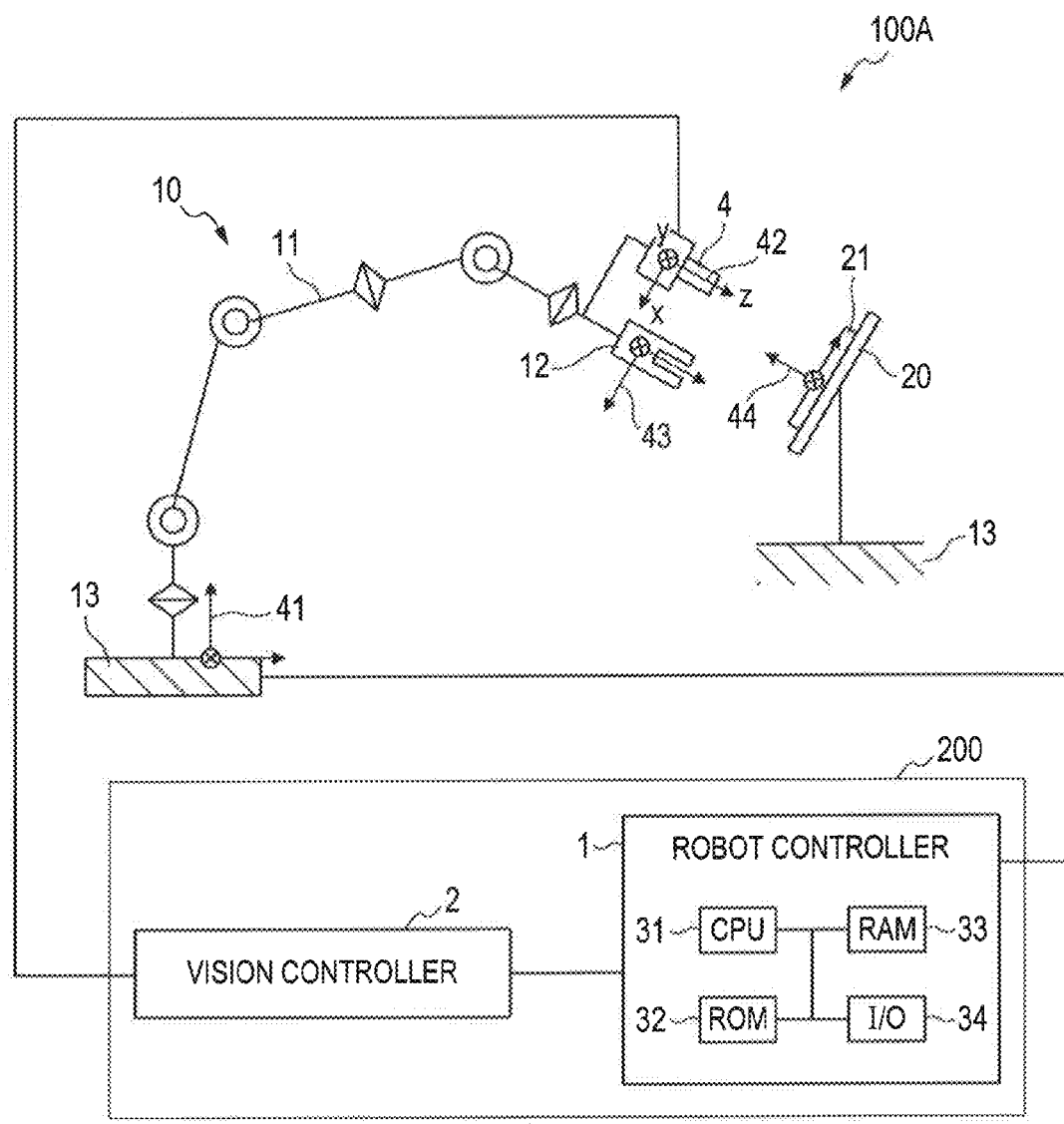
FIG. 6 is a schematic configuration diagram of a robot system according to a second embodiment of the present invention.

A second embodiment of the present invention will be described with reference to FIG. 6. The camera 3 as a visual sensor is fixed at a position different from the robot body 10 in the description of the first embodiment. In the present embodiment, a camera 4 as a visual sensor is placed on the robot body 10. The marker 21 for calibration is fixed at a position different from the robot body 10. Other configurations are the same as in the first embodiment, and differences from the first embodiment will be mainly described.

The camera 4 is mounted on the tip of the arm 11, and the operation of the robot body 10 can position the camera 4 in an arbitrary position and orientation in the operation range of the robot body 10. The camera 4 is connected to the vision controller 2.

The vision controller 2 converts an image signal imported through the camera to a contrast signal based on grayscale and stores the contrast signal in the frame memory. The vision controller 2 also processes an image stored in the frame memory, identifies an object, measures the position and orientation, and transmits an identification result of the processed object and the position and orientation to the robot controller 1. These functions are the same as in the first embodiment.

The camera 4 takes an image of an object, such as the marker 21, and transmits an image signal to the vision controller 2. Although a monocular camera is also used in the present embodiment, the sensor may be one of a compound camera, a laser range finder and a combination of the compound camera and the laser range finder that can measure three dimensions.

The marker 21 can be fixed to the calibration jig 20, and the calibration jig 20 is fixed to the environment. For example, the calibration jig 20 is fixed to a position where the work is fixed in the actual operation on the base 13. The location of the calibration jig 20 where the marker 21 is fixed may not be known. The marker 21 used here is the same as in the first embodiment.

A calibration method of a robot system 100A of the present embodiment will be described. First, a setting method of three teaching points used in the calibration will be described. While the position and orientation of the marker 21 is operated by the robot body 10 in the first embodiment, the position and orientation of the camera 4 is operated by the robot body 10 in the present embodiment. In this case, the teaching points are set such that the relative position and orientation of the camera 4 and the marker 21 is in the positional relationship as illustrated in FIGS. 3A and 3B. The setting method is the same as in the first embodiment.

The control apparatus 200 operates the robot body to obtain the three teaching points and obtains the relative position and orientation of the robot coordinate system 41 and the tool coordinate system 43 as well as the relative position and orientation of the vision coordinate system 42 and the marker coordinate system 44 at each teaching point.

The relative position and orientation of the tool coordinate system 43 and the vision coordinate system 42 will be referred to as a homogeneous transformation matrix Htv, and the relative position and orientation of the robot coordinate system 41 and the marker coordinate system 44 will be referred to as a homogeneous transformation matrix Hrp. The relative position and orientations of the robot coordinate system 41 and the tool coordinate system 43 at the three teaching points will be referred to as homogeneous transformation matrices Hrt1, Hrt2 and Hrt3. The relative position and orientations of the vision coordinate system 42 and the marker coordinate system 44 will be referred to as homogeneous transformation matrices Hvp1, Hvp2 and Hvp3, and the following simultaneous equations can be obtained.

[Expression 4]

$$\begin{cases} HtvHvp1 = (Hrt1)^{-1} Hrp \\ HtvHvp2 = (Hrt2)^{-1} Hrp \\ HtvHvp3 = (Hrt3)^{-1} Hrp \end{cases} \quad (4)$$

Optimized calculation of Htv and Hrp can be performed to solve Expression (4) to obtain the relative position and orientation Htv of the tool coordinate system 43 and the vision coordinate system 42 to be calibrated. Hrp denotes the relative position and orientation of the robot coordinate system 41 and the marker coordinate system 44. Although not limited to this, a least squares method or the like can be used to solve the optimized calculation. Since the robot coordinate system 41 and the tool coordinate system 43 are synonymous with the positions and the orientations of the teaching points, the relative position and orientation Htv of the tool coordinate system 43 and the vision coordinate system 42 can be obtained to calibrate the robot coordinate system 41 and the vision coordinate system 42.

In the present embodiment, the markers 21 of two of at least three teaching points have the same inclination in relation to the optical axis, and the two teaching points are placed on different positions of the same plane normal to the optical axis, as in the first embodiment. Therefore, the accuracy of the calibration between the robot coordinate system 41 (tool coordinate system 43) and the vision coordinate system 42 can be further improved. More specifically, even in the configuration in which the camera 4 is fixed to the robot body 10, the calibration accuracy of the robot system 100A can be improved as in the first embodiment. A special jig in which accurate design data is apparent is not necessary in the calibration, and the accuracy of the calibration can be further improved at a low cost.

Third Embodiment

A third embodiment of the present invention will be described with reference to FIGS. 1 to 3B. In the first embodiment, the position and orientations at three teaching points used in the calibration are based on the assumption that the robot body 10 can take the target positions and orientations on the calibration plane A. In the present embodiment, there is an obstacle (not illustrated) below the calibration plane A, and the robot body 10 cannot take at least one of the three teaching points on the plane A that are used in the calibration. The robot body may recognize the existence of the obstacle as known layout information of the robot system 100 set in advance, or the robot body may recognize the existence of the obstacle through imaging by the camera 3.

Only the setting method of three teaching points used in the calibration is different from the first embodiment. Therefore, differences from first embodiment will be mainly described.

In the setting method of three teaching points used in the calibration, the markers 21 of two of the three teaching points have the same inclination in relation to the optical axis (z axis) of the camera 3, and the two teaching points are placed on different positions of the same plane A normal to the optical axis, as in the first embodiment. On the other hand, in the first embodiment, the remaining one of the three teaching points other than the two points is set such that the inclination of the marker 21 in relation to the optical axis is different from that of the two points. However, there is an obstacle below the calibration plane A in the third embodiment, and the obstacle and the calibration jig 20 interfere with each other. Therefore, the teaching point cannot be set. Thus, the teaching point is moved parallel to the direction along the optical axis of the camera to set the teaching point in, so to say, the "air over the calibration plane A" to thereby prevent the interference between the obstacle and the calibration jig 20. The distance of the parallel movement can be 2 mm or less. The calibration step as in the first embodiment can be executed to calibrate the robot coordinate system 41 and the vision coordinate system 42.

An advantageous effect specific to the third embodiment is that even if the teaching points used in the calibration cannot be set only on the calibration plane A due to an obstacle, the calibration between the robot coordinate system 41 and the vision coordinate system 42 can be performed as a result of the increase in the degree of freedom in the attitude during the calibration operation.

The control apparatus 200 specifically executes the processing operation of the first, second and third embodiments described above. Therefore, a recording medium recording a program of software for realizing the functions may be supplied to the control apparatus 200, and the CPU 31 of the control apparatus 200 may read and execute the program stored in the recording medium to attain the functions. In this case, the program read from the recording medium realizes the functions of the embodiments, and the present invention includes the program and the recording medium recording the program.

In the embodiments, the computer-readable recording medium is one of the ROM 32 and the RAM 33, and the program is stored in one of the ROM 32 and the RAM 33. However, the arrangement is not limited to this. The program may be recorded in any computer-readable recording medium. Examples of the recording medium for supplying the program include an HDD, an external storage apparatus and a recording disk.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-151718, filed Jul. 22, 2013, which is hereby incorporated by reference herein in its entirety.

What is claimed is:
1. A robot system comprising:
a robot body configured to operate a work;
a visual sensor; and
a control apparatus configured to control a position and an orientation of the robot body, and to calculate a position and an orientation of the work using a measured value by the visual sensor, wherein, when observation of a marker by the visual sensor is performed for a calibration between a robot coordinate system fixed to the robot body and a vision coordinate system fixed to the visual sensor, a calibration value is calculated based on a position of the robot body in the robot coordinate system, and a position of the marker in the vision coordinate system for at least three teaching points set within a calibration area, two of the three teaching points are placed on different positions in a plane A of a finite size normal to an optical axis of the visual sensor, wherein the marker at two of the three teaching points has the same inclination in relation to the optical axis of the visual sensor, and wherein the marker at the teaching point other than the two of the three teaching points has an inclination different from that of the two of the three teaching points and crosses the plane A.

2. The robot system according to claim 1, wherein
the control apparatus moves the marker to the three teaching points by means of the robot body, and
the visual sensor at a fixed position measures a position of the marker.

3. The robot system according to claim 1, wherein
the marker is fixed at a position different from the robot body,
the visual sensor is placed on the robot body, and
the control apparatus operates the robot body such that the fixed marker is brought into the three teaching points.

4. The robot system according to claim 1, wherein
the control apparatus operates the robot body respectively
such that (1) the marker and the visual sensor are rotated relatively at a first predetermined angle α around an axis parallel to the optical axis, to bring the marker into the two of the three teaching points placed on different positions in the same plane, and
such that (2) the marker and the visual sensor are rotated relatively at a second predetermined angle β around the axis perpendicular to the optical axis, to bring the marker into the teaching point other than the two of the three teaching points.

5. The robot system according to claim 4, wherein
the first predetermined angle α meet a relation 0°<α<180°.

6. The robot system according to claim 4, wherein
the second predetermined angle β meet a relation 5°<β<10°.

7. A calibration method of a robot system, wherein
the robot system comprises:
a robot body configured to operate a work;
a visual sensor; and
a control apparatus configured to control a position and an orientation of the robot body, and to calculate a position and an orientation of the work using a measured value by the visual sensor, wherein the calibration method is performed for a calibration between a robot coordinate system fixed to the robot body and a vision coordinate system fixed to the visual sensor, and the calibration method comprises
operating, by the control apparatus, the robot body to obtain three teaching points within a calibration area; and
observing a marker by the visual sensor, to calculate a calibration value based on a position of the robot body in the robot coordinate system, and a position of the marker in the vision coordinate system for at least the three teaching points, wherein
two of the three teaching points are placed on different positions in a plane A of a finite size normal to an optical axis of the visual sensor, wherein the marker at two of the three teaching points has the same inclination in relation to the optical axis of the visual sensor, and wherein the marker at the teaching point other than the two of the three teaching points has an inclination different from that of the two of the three teaching points and crosses the plane A.

8. The calibration method according to claim 7, wherein
the operating the robot body is performed to operate the robot body respectively
such that (1) the marker and the visual sensor are rotated relatively at a first predetermined angle α around an axis parallel to the optical axis, to bring the marker into the two of the three teaching points placed on different positions in the same plane, and
such that (2) the marker and the visual sensor are rotated relatively at a second predetermined angle β around the axis perpendicular to the optical axis, to bring the marker into the teaching point other than the two of the three teaching points.

9. The calibration method according to claim 8, wherein
the first predetermined angle α meet a relation 0°<α<180°.

10. The calibration method according to claim 8, wherein
the second predetermined angle β meet a relation 5°<β<10°.

11. The calibration method according to claim 7, wherein,
when the robot body cannot brought into a position and an orientation corresponding to the teaching point other than the two of the three teaching points, the teaching point other than the two of the three teaching points is reset to be a point shifted in parallel along a direction of the optical axis of the visual sensor.

12. A non-transitory computer readable recording medium recording a program operating a computer to execute the calibration method of the robot system according to claim 11.

13. A program operating the robot system and control apparatus to execute the each of the processes of the calibration method according to claim 7.

* * * * *